Aug. 14, 1928.  C. C. SUNDERLAND  1,680,346
ROPE THIMBLE
Filed Nov. 17, 1926
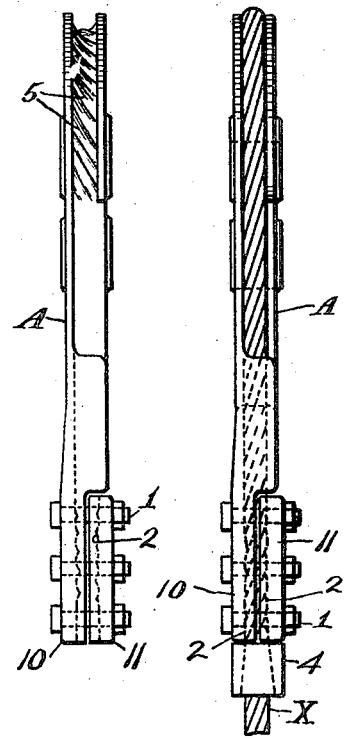
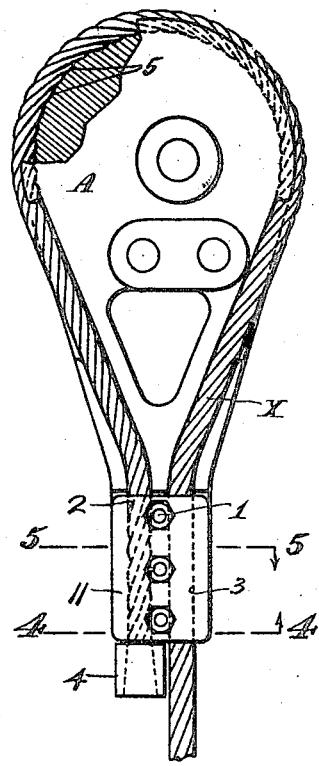
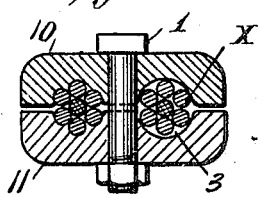
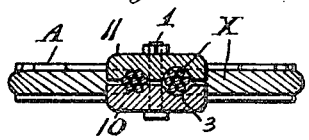
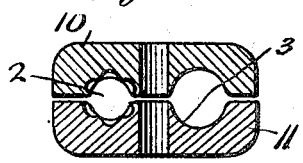
Inventor
Charles C. Sunderland
By his Attorneys Patented Aug. 14, 1928.

1,680,346

UNITED STATES PATENT OFFICE.

CHARLES C. SUNDERLAND, OF TRENTON, NEW JERSEY, ASSIGNOR TO JOHN A. ROEBLING'S SONS COMPANY, OF TRENTON, NEW JERSEY, A CORPORATION OF NEW JERSEY.

ROPE THIMBLE.

Application filed November 17, 1926. Serial No. 148,806.

The object of the present invention is to provide an improved thimble for wire rope, by which the full strength of the rope shall be secured.

The invention consists in providing a rope thimble with means by which the dead end of the rope is held with such firmness as to transfer a considerable portion of the strain to the dead end of the rope. For this purpose I use a clamp for the dead end of the rope, and the live end of the rope may be held by the clamp under a less pressure, so as to utilize to some extent the friction of the live end of the rope in the clamp, but the main feature of the invention consists in holding the dead end of the rope firmly. The dead end of the rope may be held, also, by a button bearing against the inner end of the thimble or against the clamp, and the outer end or curved end of the thimble may be formed with corrugations or other projections, or otherwise roughened, so as to increase the friction of the rope on the thimble and thus aid in securing the full strength of the rope.

For a full understanding of the invention, a detailed description of a construction embodying the invention in its preferred form will now be given in connection with the accompanying drawings forming a part of this specification, and the features forming the invention will then be specifically pointed out in the claims.

In the drawings,—

Figure 1 is an edge view, partly in section, of a thimble embodying all the features of the invention with the rope in place;

Figure 2 is a face view of the thimble, partly broken away;

Figure 3 is a view similar to Figure 1 without the rope;

Figure 4 and 5 are sections on, respectively, the lines 4—4 and 5—5 of Figure 2; and Figure 6 is a view similar to Figure 5, with the rope omitted.

Referring now to the drawings, A is the thimble provided with the usual edge groove for the rope X, and apart from the present invention may be of any suitable form. In accordance with the present invention, the thimble is formed with an extension 10 at its inner end, having grooves for the live and dead portions of the rope and co-acting with a clamp piece 11 shown as held in place by three bolts 1 to clamp the rope in the grooves. As shown, the grooves 2 in the extension 10 and clamp 11 which hold the dead end of the rope are formed with corrugations or otherwise provided with suitable means for gripping the rope so as to hold it firmly and prevent slip, while the grooves 3 for the live end of the rope are formed to hold the rope less firmly, being shown as plain grooves.

In addition to the clamp above described, the dead end of the rope X may be provided with a button 4 preferably formed by casting metal on the separated strands of the rope, this button bearing against the outer side of the clamp 11 under tension of the rope and thus assuring the holding of the dead end of the rope against any slip. The outer end of the thimble A, that is, the curved portion, may be provided with corrugations or other projections 5 to increase the friction between the rope and thimble and thus increase the snubbing action of the thimble on the rope. The desired result may be aided also by clamping the live end of the rope under such pressure as to utilize the friction of the rope in the clamp to a substantial extent.

It will be seen that the invention provides a very simple and efficient means for utilizing the full strength of the rope by holding the dead end of the rope firmly, so that the strain of the rope is quite largely transferred to the dead end and a snubbing action of the thimble on the rope thus secured.

It will be understood that the invention is not limited to the details of the construction shown, and many modifications may be made in the thimble and clamp constructions shown without departing from the invention.

What I claim is:

1. A rope thimble combined with a clamp at the inner end of the thimble for holding the dead end of the rope against slip while permitting slip on the thimble of the rest of the rope.

2. A rope thimble combined with a clamp at the inner end of the thimble for holding the dead end of the rope against slip while permitting slip on the thimble of the rest of the rope, and additional means for positively holding the dead end against slip in the clamp.

3. A rope thimble combined with means for holding the dead end of the rope against slip while permitting slip on the thimble of the rest of the rope, said thimble being provided with projections on its curved portion engaging the rope to increase the friction between the thimble and rope.

4. A rope thimble combined with a clamp at the inner end of the thimble for holding the dead end of the rope against slip while permitting slip on the thimble of the rest of the rope, said thimble being provided with projections on its curved portion engaging the rope to increase the friction between the thimble and rope.

5. A rope thimble combined with a clamp at the inner end of the thimble for holding the dead end of the rope against slip while permitting slip on the thimble of the rest of the rope, and a button on the dead end of the rope for holding the dead end positively against slip in the clamp.

6. A rope thimble combined with a clamp at the inner end of the thimble having two rope passages formed therein, one of said passages being constructed to hold the dead end of the rope against slip and the other passage constructed to permit slip of the rest of the rope on the thimble.

7. A rope thimble combined with a clamp at the inner end of the thimble having two rope passages formed therein, one of said passages being constructed to hold the dead end of the rope against slip and the other passage constructed to permit slip of the rest of the rope on the thimble, and a button on the dead end of the rope for holding the dead end positively against slip in the clamp.

In testimony whereof, I have hereunto set my hand.

CHARLES C. SUNDERLAND.